United States Patent
Watanabe

(10) Patent No.: US 7,769,541 B2
(45) Date of Patent: Aug. 3, 2010

(54) VEHICLE NAVIGATION SYSTEM AND METHOD OF GENERATING UPDATED MAP DATA FOR VEHICLE NAVIGATION SYSTEM

(75) Inventor: Shinji Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 359 days.

(21) Appl. No.: 11/436,201

(22) Filed: May 17, 2006

(65) Prior Publication Data

US 2006/0293845 A1 Dec. 28, 2006

(30) Foreign Application Priority Data

Jun. 24, 2005 (JP) ............................. 2005-184334

(51) Int. Cl.
*G01C 21/32* (2006.01)
(52) U.S. Cl. ...................................... 701/210; 701/208
(58) Field of Classification Search ................ 701/208, 701/209, 210, 214
See application file for complete search history.

(56) References Cited

U.S. PATENT DOCUMENTS

| | | | |
|---|---|---|---|
| 6,178,377 B1* | 1/2001 | Ishihara et al. .............. 701/200 |
| 6,253,151 B1* | 6/2001 | Ohler et al. ................. 701/208 |
| 6,298,305 B1* | 10/2001 | Kadaba et al. .............. 701/211 |
| 6,549,847 B2 | 4/2003 | Ikeuchi et al. |
| 6,845,319 B2* | 1/2005 | Uchida ....................... 701/208 |
| 6,941,220 B2* | 9/2005 | Le et al. ...................... 701/208 |
| 6,970,782 B2* | 11/2005 | Watanabe et al. ........... 701/200 |
| 6,980,907 B2* | 12/2005 | Umezu et al. ............... 701/210 |
| 7,103,854 B2* | 9/2006 | Fuchs et al. ................. 715/855 |
| 7,363,151 B2* | 4/2008 | Nomura et al. ............. 701/208 |
| 7,383,127 B2* | 6/2008 | Matsuo et al. .............. 701/211 |
| 2002/0087261 A1* | 7/2002 | Watanabe et al. ........... 701/200 |
| 2004/0001114 A1* | 1/2004 | Fuchs et al. ................. 345/855 |
| 2004/0002812 A1* | 1/2004 | Yamanaka .................. 701/208 |
| 2007/0032949 A1* | 2/2007 | Arai et al. ................... 701/211 |
| 2007/0150840 A1* | 6/2007 | Olcott et al. ................ 715/854 |
| 2008/0065325 A1* | 3/2008 | Geelen et al. ............... 701/210 |
| 2008/0082225 A1* | 4/2008 | Barrett ........................ 701/26 |
| 2008/0177469 A1* | 7/2008 | Geelen et al. ............... 701/209 |

* cited by examiner

*Primary Examiner*—Scott A Hughes
(74) *Attorney, Agent, or Firm*—Brinks Hofer Gilson & Lione

(57) ABSTRACT

There is provided a vehicle navigation system for searching predetermined information after map data is updated and navigating a user more effectively even when the user only knows information before the update. The vehicle navigation system includes a control section; a map data read section for reading first map data from a map database; a map data acquisition section for acquiring second map data for update; a map data update section for generating updated map data by using the first map data and the second map data; and a history information management section for managing a search result, a travel route or the like, which the user obtained by specifying search conditions, as history information, wherein the map data update section generates the updated map data so as to associate the first map data, which is associated with the history information, together with the second map data.

15 Claims, 5 Drawing Sheets

F I G. 4
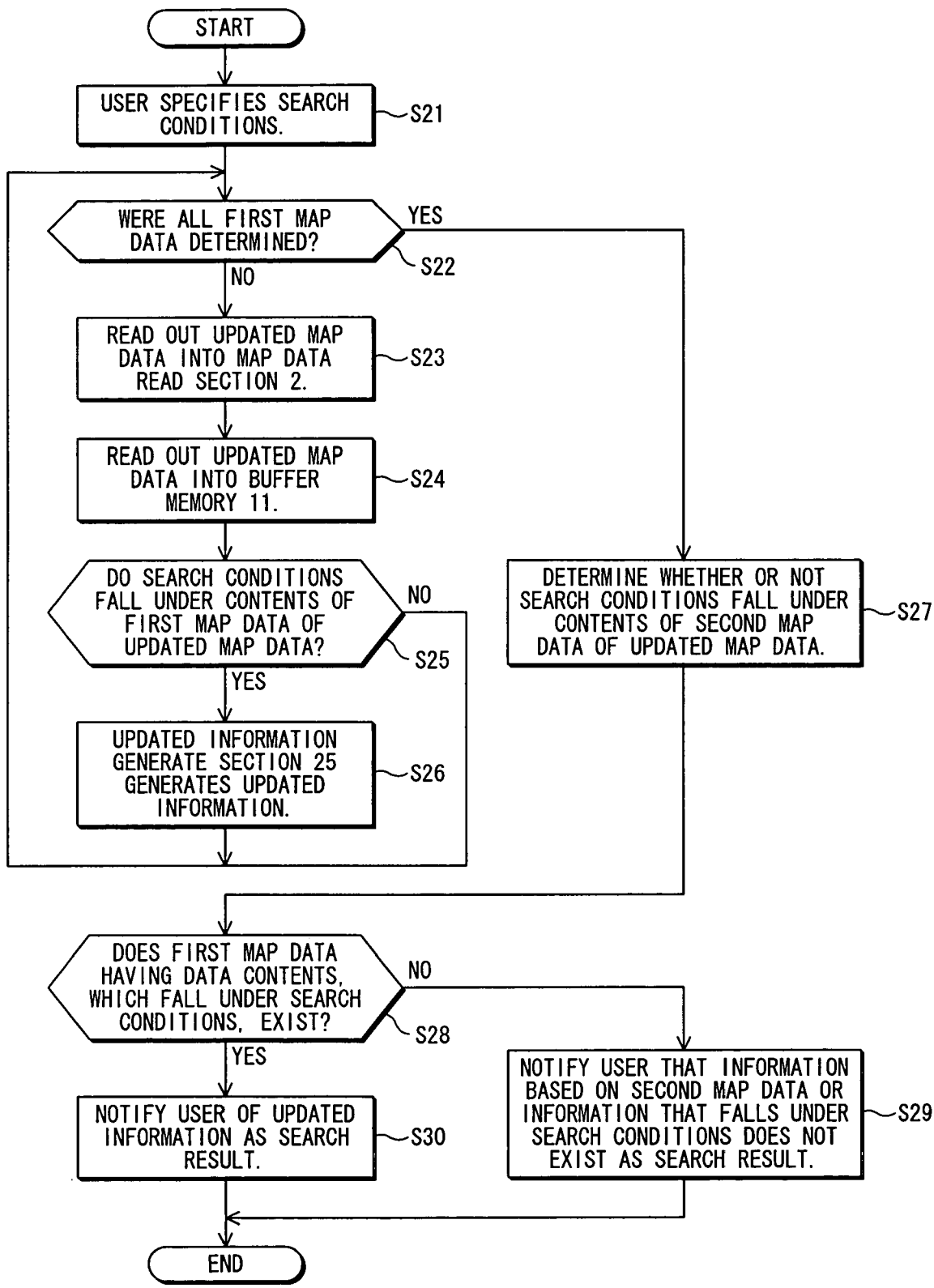

VEHICLE NAVIGATION SYSTEM AND METHOD OF GENERATING UPDATED MAP DATA FOR VEHICLE NAVIGATION SYSTEM

BACKGROUND OF THE INVENTION

1. Field of the Invention

The present invention relates to a vehicle navigation system and a method of generating updated map data for the vehicle navigation system.

2. Description of the Related Art

In recent years, a vehicle navigation system, which receives positional information of a current traveling position of a vehicle from satellites and displays the positional information of the vehicle on a display together with map information to navigate a user, has been put into practical use. Further, the vehicle navigation system displays icons indicating various kinds of facility on the display together with a road map. Map data including the road map and facility information is utilized by the vehicle navigation system as a map database in a stored state in a storage medium or a storage device. The map database is realized by a HDD (Hard Disc Drive) in addition to a CD (Compact Disc)-ROM (Read Only Memory) and a DVD (Digital Versatile Disc)-ROM into which the map data is stored. Then, when the HDD stores the map data, the stored map data can be replaced with updated new map data. Although the user can know the latest map information by the updated map data, there is a problem that the map information may not be appropriate for making an accurate decision if it is hard to recognize whether the map information displayed on the display is updated or not.

For such a problem, Japanese Patent Laid-Open No. 2002-188926 suggested a technology as described below. Japanese Patent Laid-Open No. 2002-188926 suggests a navigation system that readily transmits updated map information (second map data) to the user when old map information (first map data) is updated by difference information or the like. According to the navigation system, it is possible to readily transmit updated map information to the user by displaying map information based on data, which was detected by a difference data detecting section, in an emphasized manner or by providing the information in an emphasized manner. Further, in Japanese Patent Laid-Open No. 2002-188926, the detail level of emphasis display is determined depending on usage characteristics that a map data usage characteristics learning section learned. This makes it possible to change the detail level of contents to be shown to the user depending on use frequency, such that the detailed contents of updated map information around a road that the user frequently uses is shown to the user. Furthermore, with the suggested technology of Japanese Patent Laid-Open No. 2002-188926, it is possible to select or specify map information that the user wants to acquire from outside. As described, by updating only map information that the user needs, the data capacity that the navigation system can store can be controlled.

However, in the case where a user who does not know that a facility was changed to another facility tries to search for the facility before the change, the suggested technology of Japanese Patent Laid-Open No. 2002-188926 does not include a function capable of searching for a target facility. So, the suggested technology of Japanese Patent Laid-Open No. 2002-188926 is unable to provide the user with a useful search result in such a situation. Further, in the suggested technology of Japanese Patent Laid-Open No. 2002-188926, the detail level of emphasis display is determined depending on the use frequency, but it is not always necessary to display updated facility information around a road that the user has never used, for example, in an emphasized manner even if it was updated. This is because the user only comes to know a facility around the road, which he/she has never used before, for the first time after the update. In many cases, it is not inconvenient for the user even if he/she does not know what the facility was before the change. Herein, Japanese Patent Laid-Open No. 2002-188926 exemplifies a mode of emphasis display where a road before a change and a road after the change are simultaneously displayed as a mode of emphasis display in Embodiment 1. However, map information before an update is needed in order to execute emphasis display in such a mode. For this reason, in the suggested technology of Japanese Patent Laid-Open No. 2002-188926, map information after an update must be stored in a storage medium together with all corresponding map information before the update. Furthermore, the detail level of emphasis display can be changed depending on use frequency in the suggested technology of Japanese Patent Laid-Open No. 2002-188926, but even if it is possible not to display the map information before an update by the detail level of emphasis display, such information is not simply displayed. In other words, from the above-described viewpoint, since even the map information after an update, whose emphasis display is not necessary, must be stored together with the map information before an update, the data capacity is increased by the map information after the update. In addition, with the suggested technology of Japanese Patent Laid-Open No. 2002-188926, map information that the user wants to acquire from outside can be selected or specified, but it is difficult to make the user select or specify whether or not to acquire map information of a facility around a road that he/she has never used before, for example, and it is not very convenient even if it is possible.

SUMMARY OF THE INVENTION

The present invention has been created in view of the above-described problems, and it is an object of the invention to provide a vehicle navigation system capable of searching predetermined information after map data was updated, even if a user only knows information before the update, and capable of navigating the user more effectively, and a method of generating updated map data in the vehicle navigation system.

To solve the above-described problems, the present invention is a vehicle navigation system including: a control section; a map data read section for reading first map data from a map database; a map data acquisition section for acquiring second map data for update; a map data update section for generating updated map data by using the first map data and the second map data; and a history information management section for managing a search result, a travel route or the like, which the user obtained by specifying search conditions, as history information, in which the map data update section generates the updated map data so as to associate the first map data, which is associated with the history information, together with the second map data.

In the present invention, the updated map data generated by the map data update section has the first map data (map data before change) associated with the history information together with the corresponding second map data (map data after change). Utilizing such updated map data makes it possible to provide various kinds of information readily transmitted to the user even if the user does not know of the change of facility when the vehicle navigation system displays facility information before change together with facility information after change. Further, in the present invention, the first map data associated with the history information is map data before change necessary for the user. Accordingly, the system is capable of providing various kinds of information readily transmitted to the user as described above and yet can restrict the capacity of the updated map data at a lower level. Further, in generating updated map data, the user does not need to specify conditions for including the first map data in the updated map data for a certain area, for example, so that labor required by the user can be omitted.

Further, in the present invention, when the map data update section determines whether the first map data and the corresponding second map data are identical or different, the map data update section generates the updated map data so as to associate the first map data, which is associated with the history information, together with the second map data, and generates the updated map data by updating the first map data, which is not associated with the history information, into the corresponding second map data.

According to the present invention, in the case where the second map data is not made up of only map data required for update, the map data update section, when the first map data and the corresponding second map data are different, can detect the different second map data as the second map data required for update. This makes it possible to generate the updated map data that has the first map data associated with the history information together with the corresponding second map data required for update. Meanwhile, when the first map data is identical with the corresponding second map data, the updated map data may be generated by using either map data.

Further, the present invention can include the map database as a storage device storing the first map data therein, and the map data update section may store the updated map data as new first map data into the storage device instead of the first map data. It is possible to provide a storage device for the system and the generated updated map data can be stored in the device, but since the storage device storing the map data is used as the map database in the present invention, there is no need to provide a storage device separately. Furthermore, in updating the map data next time, the updated map data can be generated by using the new first map data stored in the storage device and the second map data newly acquired. Meanwhile, even in the case where the map database is a storage medium storing the map data, when the first map data is stored in a storage device separately provided, for example, the updated map data can be generated by using the new first map data and the second map data newly acquired in updating the map data next time.

Furthermore, in the present invention, for search conditions specified by the user, the control section may search map data having data contents that fall within the search conditions by referring to the first map data and the second map data, which the updated map data has. According to the present invention, even when the user searches for a facility that he/she visited before without knowing that the facility has changed, for example, the vehicle navigation system can search for the facility to provide it the user as useful information.

Further, the present invention may include a first updated information generation section that generates updated information for displaying display information based on the first map data that the updated map data has together with display information based on the corresponding second map data. According to the present invention, even when the user specifies a changed facility as a search condition as described above, for example, the vehicle navigation system can display the generated updated information to notify the user of the facility before and after the change. With this, the user can know the position of the facility that he/she specified as the search condition and can know that the facility has changed.

Further, in the present invention, the display information can be an icon indicating a facility, and when the positional information of the facility based on the first map data and the positional information of the facility based on the second map data are different, the first updated information generation section may generate display information notifying that the position is where the facility existed before instead of an icon based on the first map data, as updated information. According to the present invention, even when the user specifies the facility as the search condition not knowing that the facility has moved, the vehicle navigation system can notify the user of a position where the facility was by displaying updated information such as "This is where ○○ was before", for example.

Further, in the present invention, the first updated information generation section may generate display information for asking the user if the position of the facility after removal based on the second map data should be displayed as updated information. According to the present invention, the vehicle navigation system, after notifying that the facility moved as described above, can ask the user if the new destination of the facility should be displayed by displaying updated information such as "Do you want to display the new destination of the facility?", for example. In response, when the user wants to know the new destination of the facility, he/she can know the position of the facility at the new destination by selecting a sub-menu such as "Display the new destination of the facility", for example.

Further, the present invention may include a second updated information generation section that generates updated information for alternately displaying the display information based on the first map data that the updated map data has with the display information based on the corresponding second map data. According to the present invention, it is also possible to display updated information for alternately displaying display information to notify the user of the information.

Furthermore, in the present invention, the display information may be a facility name. According to the present invention, by displaying "○○○○○ shop (old xxxx shop)", it is possible to notify the user that the facility has changed.

Further, the present invention may include a third updated information generation section for generating updated information to produce voice guidance based on the first map data that the updated map data has together with voice guidance based on the corresponding second map data. According to the present invention, the vehicle navigation system can notify the user that the facility has changed by providing voice guidance such as "Turn right at the intersection 300 m ahead. Use "○○○○○ shop" as a landmark. It was "xxxx shop"" before a vehicle comes to the intersection.

Further, in the present invention, in the case where map data having data contents, which fall within search conditions specified by the user, is the first map data that the updated map data has, the control section may execute a command for displaying or producing the updated information in notifying the user of a search result. According to the present invention, it is possible to effectively display the update information to notify the user of the information by displaying or providing voice guidance in notifying the search result.

Further, in the present invention, when the user is in the process of executing route guidance to a specified destination, the control section may execute a command for displaying or producing the updated information at a predetermined timing. According to the present invention, it is possible to effectively display the update information to notify the user of the information by displaying or providing voice guidance when he/she is executing the route guidance. Additionally, the updated information may be displayed when the above-described search result is provided.

Further, in the present invention, when a road map is being displayed, the control section may execute a command for displaying or producing the updated information at a predetermined timing. According to the present invention, even when the road map showing the current position of the vehicle is being displayed, for example, it is possible to display the updated information at the timing when an appropriate facility is displayed to notify the user of the information. In addition, even when the user tries to refer to a road map other than the one showing the current position of the vehicle, it is possible to display the updated information to notify the user of the information if an appropriate facility is in the road map being displayed.

Further, in the present invention, the map data update section may update the first map data that the map data update section has into the corresponding second map data when the user performs a predetermined operation. According to the present invention, in the case where the user determines that only a facility after change should be displayed from the next time after the above-described updated information is displayed or provided by voice guidance, it is possible to display only a facility after change. This makes it possible to update the first map data into the second map data to reduce the capacity of updated map data.

Further, in the present invention, when the data capacity of the storage device reaches a predetermined capacity, the map data update section may update the first map data that the map data update section has into the corresponding second map data. According to the present invention, it is possible to prevent data that the storage device stores from overflowing its capacity. Note that the first map data may be updated into the corresponding second map data when the updated map data reaches a predetermined capacity. In addition, in updating the first map data into the corresponding second map data, "Storage device is running out of capacity. Do you want to update the map data?" is displayed, for example, and the user may be allowed to select updating the first map data that the updated map data has into the corresponding second map data to secure capacity or to select withdrawing an operation to increase capacity.

Further, the present invention is a vehicle navigation system including: a control section; a map data read section for reading first map data from a map database; a map data acquisition section for acquiring second map data for update; a map data update section for generating updated map data by using the first map data and the second map data; and a history information management section for managing a search result, travel route or the like, which the user obtained by specifying search conditions, as history information, in which the system executes a step where the map data update section determines whether or not the first map data is associated with the history information, and a step where the map data update section generates the updated map data so as to associate the first map data and the corresponding second map data with each other when the first map data is associated with the history information.

BRIEF DESCRIPTION OF THE DRAWINGS

FIG. 4 is a flowchart of processing that generates updated information transmitted to a user by using the updated map data (new first map data) and timing of notifying the user of updated information.

DETAILED DESCRIPTION OF PREFERRED EMBODIMENTS

Figure 1:
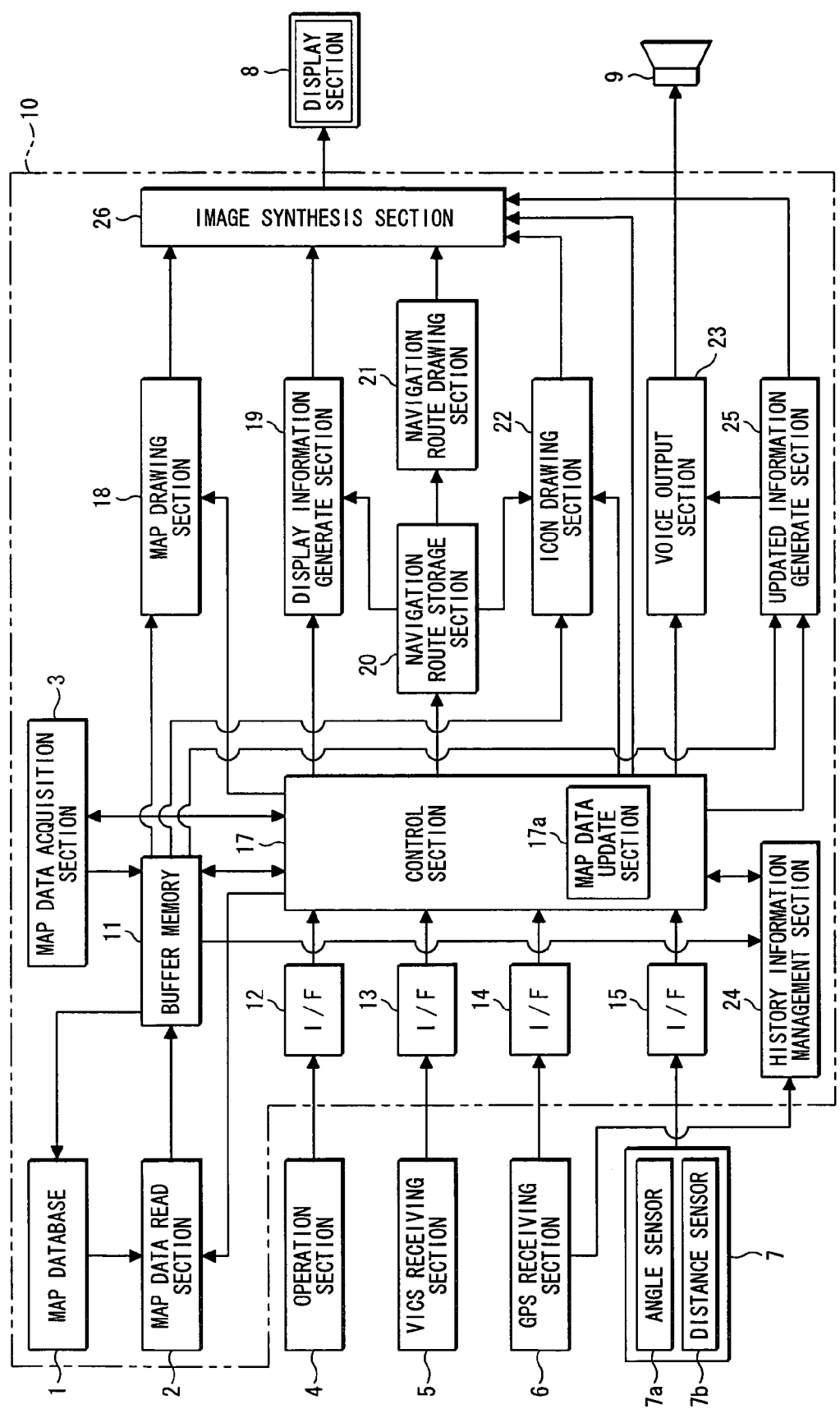
FIG. 1 illustrates a vehicle navigation system 10 according to an embodiment of the invention.

In the following, the best mode for implementing the present invention will be described in detail while referring to the drawings.

Description will be made in detail for the constitution of the vehicle navigation system 10 according to this embodiment by using FIG. 1. In FIG. 1, map database 1 is a HDD (Hard Disc Drive) storing the first map data therein. However, the database is not limited to this and may be a storage medium such as a CD (Compact Disc)-ROM (Read Only Memory), a DVD (Digital Versatile Disc)-ROM, or another storage device. The map data contains voice guidance information or the like in addition to road information and facility. A map data read section 2 is provided for reading map data from the map database 1. A map data acquisition section 3 is provided for acquiring the latest map information as the second map data from outside of the vehicle navigation system 10 through radio communication such as a cell phone. Note that the map database 1 is included in the vehicle navigation system according to the present embodiment when the map database 1 is a storage device such as the HDD, but the map database 1 may not be included as part of the vehicle navigation system when the map database 1 is a storage medium such as the CD-ROM.

An operation section 4 is provided for entering various kinds of operations and settings to the vehicle navigation system 10 performed by the user. This may be separately constituted, such as a remote controller and a control panel, or it may be constituted as an input device of a touch panel, which is integrally formed with a display section 8 (described later). Furthermore, it may be constituted by a microphone or the like for entering voice instructions.

A VICS (Vehicle Information and Communication System) receiving section 5 receives VICS information transmitted from a radio beacon or an optical beacon. A GPS (Global Positioning System) receiving section 6 receives GPS signals transmitted from GPS satellites to detect latitude and longitude of the current position of a vehicle. An autonomous navigation sensor 7 comprises an angle sensor 7a including a gyro or the like for detecting vehicle bearing and a distance sensor 7b generating a pulse at every fixed traveling distance, whereby the sensor detects the traveling direction and the speed of a vehicle.

The display section 8 is constituted by a display device of a liquid crystal display, for example, and displays various kinds of information such as a map, a navigation route, the current position of a vehicle, buildings and other icons, which are supplied from the vehicle navigation system 10. A speaker 9 provides voice guidance information or the like that also is supplied from the vehicle navigation system 10. Note that the speaker 9 can produce music or the like that was supplied from an audio device or the like.

Further, in the vehicle navigation system 10, a buffer memory 11 is provided for temporarily storing the map data or the like, which was received from the map data read section 2 or the map data acquisition section 3, under the control of a control section 17 (described later). I/F (interface) (12, 13, 14, 15) severally connects the operation section 4, the VICS receiving section 5, the GPS receiving section 6 and the autonomous navigation sensor 7 with internal bus in the vehicle navigation system 10.

The control section 17 comprises a processing unit such as a micro-computer or a CPU (Central Processing Unit), for example. The control section 17 incorporates a program for navigation, and executes various kinds of processing related to navigation such as detecting the current position of a vehicle based on signals received from the GPS receiving section 6 and the autonomous navigation sensor 7, reading out the data or the like of a map that is to be displayed from the map data read section 2 into the buffer memory 11, searching for a navigation route from the map data that was read out into the buffer memory 11, and searching for one or more navigation routes that match set search conditions by using the map data that was read out into the buffer memory 11, according to the program. Note that the above-described program can be stored in the CD-ROM, the DVD-ROM or the like, for example. In this case, the control section 17 reads out the program to execute it when necessary.

A map drawing section 18 performs a drawing processing by using the map data that was read out into the buffer memory 11. A display information generation section 19 generates various kinds of menu screens (operation screens) and various kinds of marks such as a cursor depending on an operating status. A navigation route storage section 20 is provided for storing data regarding all nodes of navigation routes, which were searched in the control section 17 based on a starting place, a destination and other search conditions, and data of navigation routes that were changed while searching (hereinafter, these data are referred to as navigation route data). A navigation route drawing section 21 reads out a navigation route from the navigation route storage section 20 and draws the navigation route in a different display mode (such as an emphasis display using color and line width) from other roads. An icon drawing section 22 performs a drawing processing of icons of buildings, locations, a user's own car, other cars and the like to be drawn on a map image. A voice output section 23 includes a DSP (Digital Signal Processor) or the like, for example, and supplies voice signals based on signals from the control section 17 to the speaker 9.

A history information management section 24 manages search results and travel routes, which were obtained for search conditions specified by the user, as history information. The search results that are managed as the history information are obtained as follows, for example. A search operation screen that the display information generation section 19 generates is displayed on the display section 8 by a user's operation, and the user enters the search conditions on the operation section 4 according to the search operation screen displayed. The control section 17 to which the search conditions are supplied refers to the first map data that was read out into the buffer memory 11, and determines whether or not map data that falls within the search conditions exists. When appropriate map data exists, the appropriate map data as a search result is managed as history information in the history information management section 24. However, search conditions such as a facility name specified by the user, for example, can be also managed as history information. In addition, a travel route managed as history information is obtained by acquiring the latitude and longitude of the current position of a vehicle, which was detected by the GPS receiving section 6 based on GPS signals, for example.

Furthermore, the control section 17 includes a map data update section 17a that generates updated map data by using the first map data and the second map data, which were read out into the buffer memory 11. Further, the map data update section 17a stores the updated map data as new first map data into the map database 1 instead of the first map data. In updating the map data next time, the map data update section 17a generates the updated map data by using the new first map data read out into the buffer memory 11 and the second map data that the map data acquisition section 3 newly acquired. Meanwhile, when the map database 1 is a storage medium such as a CD-ROM, a storage device is separately provided for the vehicle navigation system 10 and the new first map data can be stored in the storage device as well. In this case, after the new first map data is stored, the control section 17 reads out the new first map data as the first map data from the storage device, which was separately provided, into the buffer memory 11.

More specifically, the above-described map data update section 17a generates the updated map data as shown below. The map data update section 17a determines whether or not the first map data read out into the buffer memory 11 and the corresponding second map data are identical. Whether or not the first map data corresponds to the second map data is determined for example, by whether or not data addresses in a map data structure match. When the first map data is identical to the second map data, the map data update section 17a generates the updated map data by saving the first map data. However, as an alternative, it is possible to generate the updated map data by updating the first map data into the second map data.

If the first map data is different from the corresponding second map data, the map data update section 17a then determines whether or not the first map data is associated with the history information stored in the history information management section 24. For example, when the map data managed as history information matches the first map data, the first map data is associated with the history information. Furthermore, in the case where the history information is a travel route, when it is determined that a facility based on the first map data exists in a range that is regarded to be along the travel route, the first map data is associated with the history information. In the case where the first map data is associated with the history information, the map data update section 17a generates the updated map data so as to associate the first map data and the second map data with each other. If the first map data is not associated with the history information, the map data update section 17a generates the updated map data by updating the first map data into the second map data. The updated map data generated as described above is stored into the map database 1 as the new first map data instead of the first map data by the map data update section 17a.

Figure 2:
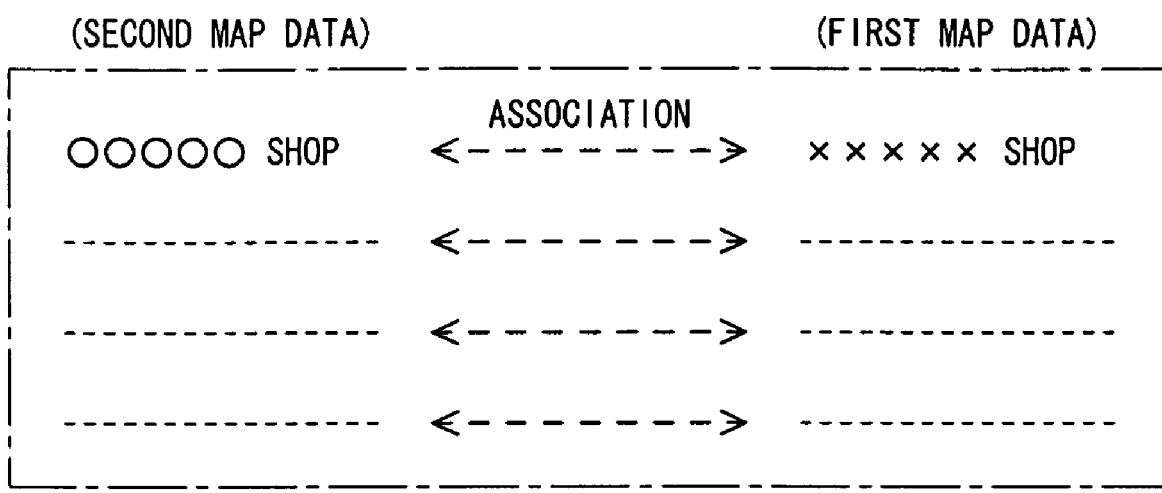
FIG. 2 illustrates an example of new first map data (updated map data) stored in a map database.

FIG. 2 illustrates an example of the new first map data (updated map data) stored in the map database 1. As shown in FIG. 2, the new first map data includes the first map data having a facility name "xxxxx shop" (map data before facility change) as data content together with the second map data having a facility name "○○○○○ shop" (map data after facility change) as data content. Further, as shown in FIG. 2, the first map data is stored in the map database 1 in an associated manner with the second map data. Consequently, in reading out the first map data that the new first map data (updated map data) has into the buffer memory 11 using the map data read section 2, for example, the associated second map data can be read out simultaneously. Note that the user has searched the "xxxxx shop" before, and the first map data having the "xxxxx shop" as data content, which was obtained as a search result, has been managed as history information by the history information management section 24.

An updated information generation section 25 is made up of a first updated information generation section 25a, a second updated information generation section 25b, and a third updated information generation section 25c, and generates updated information by the following method, based on updated map that was read out into the buffer memory 11. The first updated information generation section 25a generates updated information for displaying display information based on the first map data, which the updated map data has, together with display information based on the corresponding second map data. Further, the first updated information generation section 25a determines whether or not the positional information of a facility based on the first map data is different from the positional information of the facility based on the second map data, and in the case where the positional information is different, that is, when the facility has moved, the section generates display information notifying that it is a position where the facility once was instead of an icon as the display information based on the first map data. Moreover, the first updated information generation section 25a generates display information for asking the user whether or not a facility position after removal based on the second map data should be displayed as updated information after displaying the updated information that was generated as described above.

The second updated information generation section 25b generates updated information for displaying the display information based on the first map data, which the updated map data has, alternately with the display information based on the corresponding second map data. Further, the third updated information generation section 25c generates updated information for producing voice guidance based on the first map data, which the updated map data has, together with voice guidance based on the corresponding second map data.

An image synthesis section 26 is provided for appropriately superposing navigation routes drawn by the navigation route drawing section 21, operation screens and various marks drawn by the display information generation section 19, various icons drawn by the icon drawing section 22, updated information generated by the updated information generation section 25, images supplied from the control section 17 and the like on a map image drawn by the map drawing section 18 to display them on the display section 8.

Figure 3:
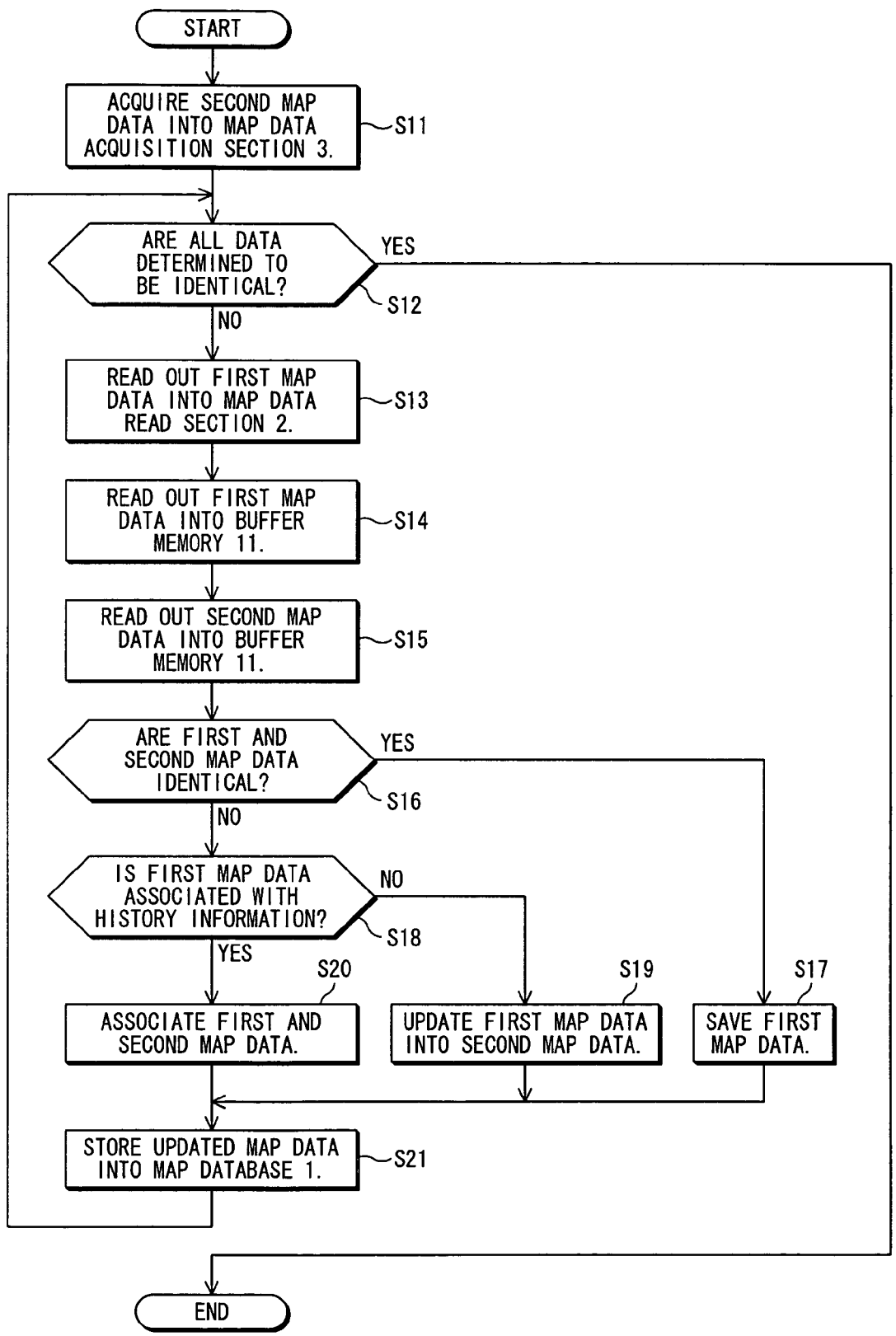
FIG. 3 is a flowchart of processing executed by the vehicle navigation system in order to generate updated map data.

In the above-described construction, a control example executed by the vehicle navigation system 10 in order to generate updated map data will be described in detail by using the flowchart shown in FIG. 3. In FIG. 3, the user operates a cell phone or the like to acquire the latest map information as the second map data into the map data acquisition section 3 by radio communication from outside of the vehicle navigation system 10 (step 11). When the map data acquisition section 3 sends a signal to the control section 17, notifying that it acquired the second map data the control section 17 first judges whether the first map data, is determined to be identical to the corresponding second map data for all data (step 12). When the determination is affirmative for all data, the control section 17 skips the process shown in steps 13 to 15 (described later) for reading the first and second map data into the buffer memory 11 assuming that all updated map information was generated. If the determination is negative, the control section 17 reads out the first map data from the map database 1 into the map data read section 2 (step 13), and furthermore, reads out the first map data from the map data read section 2 into the buffer memory 11 (step 14). Subsequently, the control section 17 reads out the second map data corresponding to the first map data from the map data acquisition section 3 into the buffer memory 11 (step 15).

Subsequently, the map data update section 17a determines whether the first map data read out into the buffer memory 11 is identical to the corresponding second map data (step 16). When they are identical, the map data update section 17a generates updated map data by saving the first map data without updating it (step 17). If they are not identical, the map data update section 17a determines whether or not the first map data is associated with history information (step 18). If they are not associated, the map data update section 17a generates updated map data by updating the first map data into the second map data (step 19). When they are associated, the map data update section 17a generates updated map data so as to associate the first map data and the second map data with each other (step 20). The map data update section 17a stores the updated map data, which was generated in step 17, step 19 or step 20, as the new first map data instead of the first map data into the map database 1 (step 21). The map data update section 17a executes step 12 again, and executes step 13 to step 21 repeatedly until it is determined that the first map data is identical to the corresponding second map data for all data. Note that whether or not the determination has been made for all map data is determined by whether or not all map data was read out for all data addresses, for example. Consequently, it is possible to generate updated map data that has the first map data associated with the history information together with the corresponding second map data.

Next, description will be made in detail for an example of timing when the updated information generation section 25 generates updated information readily transmitted to the user by using the updated map data (new first map data) and when the generated updated information is provided to the user by using the flowchart shown in FIG. 4. In this example, when the user specifies search conditions and the search conditions fall within the data contents of the first map data that the updated map data has, the updated information is generated according to predetermined conditions shown below. However, in the case where the user sets a destination, the updated information can be also generated when a facility, which is included in a predetermined range that is regarded to be along a travel route, falls within the data contents of the first map data that the updated map data has. Further, to reflect the updated information on a road map displaying the current position of the vehicle, it is also possible to generate the updated information when displaying information based on the second map data corresponding to the first map data that the updated map data has, more accurately, in a predetermined time immediately before that time.

As shown in FIG. 4, the user first specifies search conditions by using the operation section 8 (step 21). The control section 17 to which the search conditions were entered judges if a determination was made for all the first map data, which the updated map data (new first map data) has, on whether or not the contents of the data fall within the search conditions (step 22). If the determination was not done for all data yet, the control section 17 reads out the updated map data from the map database 1 into the map data read section 2 (step 23), and furthermore, reads out the updated map data from the map data read section 2 into the buffer memory 11 (step 24). Subsequently, the control section 17 determines whether or not the search conditions fall within the data contents of the first map data that the updated map data has (step 25). If the conditions do not fall within the contents, the control section 17 executes step 22. When the conditions fall within the contents, the control section 17 issues a command to the updated information generation section 25, and the updated information generate section 25 that received the command reads out appropriate first map data and the corresponding second map data from the buffer memory 11 to generate updated information (step 26). More specifically, the first to the third updated information generation sections 25*a*, 25*b*, 25*c* generate the updated information as described above. Meanwhile, on step 25, in the case where the search conditions fall within the data contents of the second map data corresponding to the first map data that the updated map data has, the updated information may be similarly generated in step 26.

The control section 17 executes step 22 again after it issues the command to the updated information generation section 25. The control section 17 executes step 23 to step 26 repeatedly until the determination is made for all the first map data, which the updated map data has, on whether or not the contents of the data fall within the search conditions. In the case where it is judged that the determination was made for all the data, the control section 17 subsequently judges whether or not the contents of the second map data, which the updated map data has, fall under the search conditions (step 27). Note that detailed explanation of this step will be omitted because it is not relevant to the generation of updated information. Then, the control section 17 judges whether or not first map data having the data contents that fall within the search conditions exists (step 28). If the first map data having the appropriate data contents does not exist, the control section notifies the user that information based on the second map data or information that falls within the search conditions did not exist as a search result (step 29). When the appropriate first map data exists, the control section 17 notifies the user of the updated information that the updated information generation section 25 generated as a search result (step 30).

Figure 5:
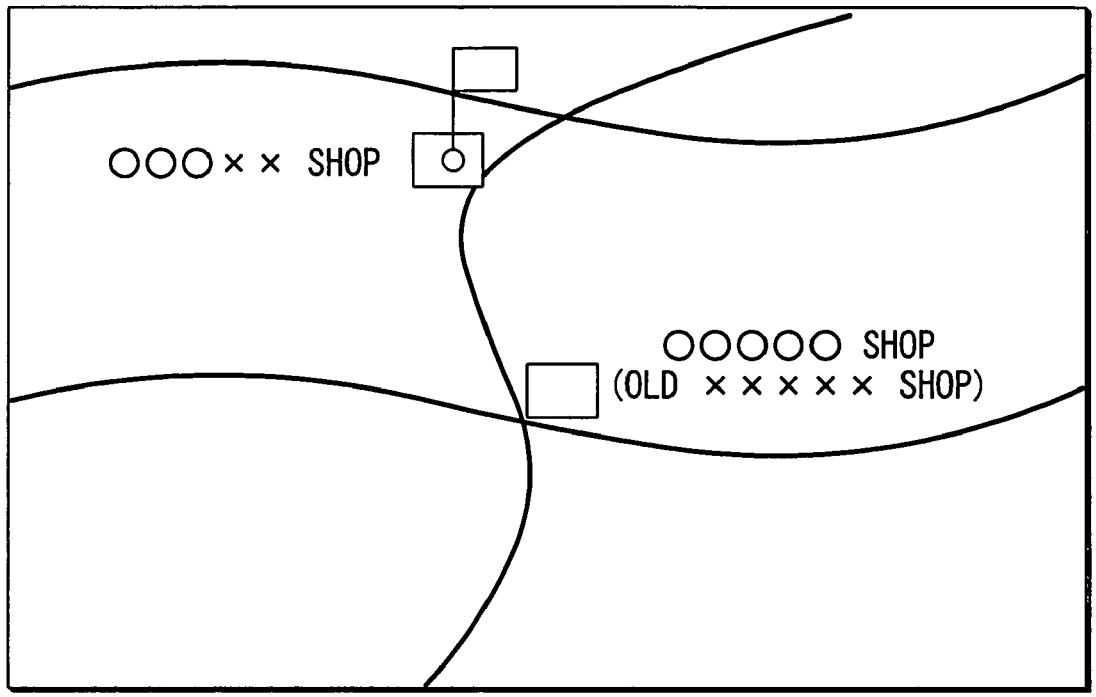
FIG. 5 is an example of a display screen for notifying the user of updated information as a search result.

FIG. 5 illustrates an example of a display screen for notifying a user of updated information as a search result in the above-described step 30. In this example, the user specified the facility name "xxxxx shop" that he/she has searched before updating the map data, as a search condition. "xxxx shop" is currently changed to "○○○○○ shop", and the updated map data was generated by using the second map data having "○○○○○ shop" as the data contents of the second map data. In the vehicle navigation system 10 according to this embodiment, the updated map data includes the first map data associated with the history information together with the second map data as described above. In other words, since the updated map data includes the first map data having "xxxxx shop" as the data contents together with second map data having "○○○○○ shop" as the data contents, the control section 17 can search the first map data having the data contents that fall under "xxxxx shop" from the updated map data and notify the user of it as a search result even if the user specified "xxxxx shop" as a search condition. Moreover, in this embodiment, the updated information that the first updated information generation section 25*a* generated can be displayed as a search result simultaneously with "○○○○○ shop (old xxxxx shop)", as shown in FIG. 5. Consequently, even if a user who does not know that the shop was changed to "○○○○○ shop" specified "xxxxx shop" as a search condition, the user can know the position of "xxxxx shop" and also can know that it was changed to "○○○○○ shop" at the same time.

Further, by using the updated information that the second updated information generation section 25*b* generated, it is possible to display updated information by alternately displaying the facility names instead of simultaneously displaying the facility names as described above. Which of the updated information that the updated information generation section 25*a* generated and the updated information that the updated information generation section 25*b* generated should be displayed may be selectable by a setting, for example. The updated information generation section 25 may include only the updated information generation section 25*b*, or alternatively, may include only the updated information generation section 25*a*. By displaying such updated information, the vehicle navigation system 10 is capable of searching predetermined information after the map data was updated even in the case where the user only knows information before the update.

Figure 6:
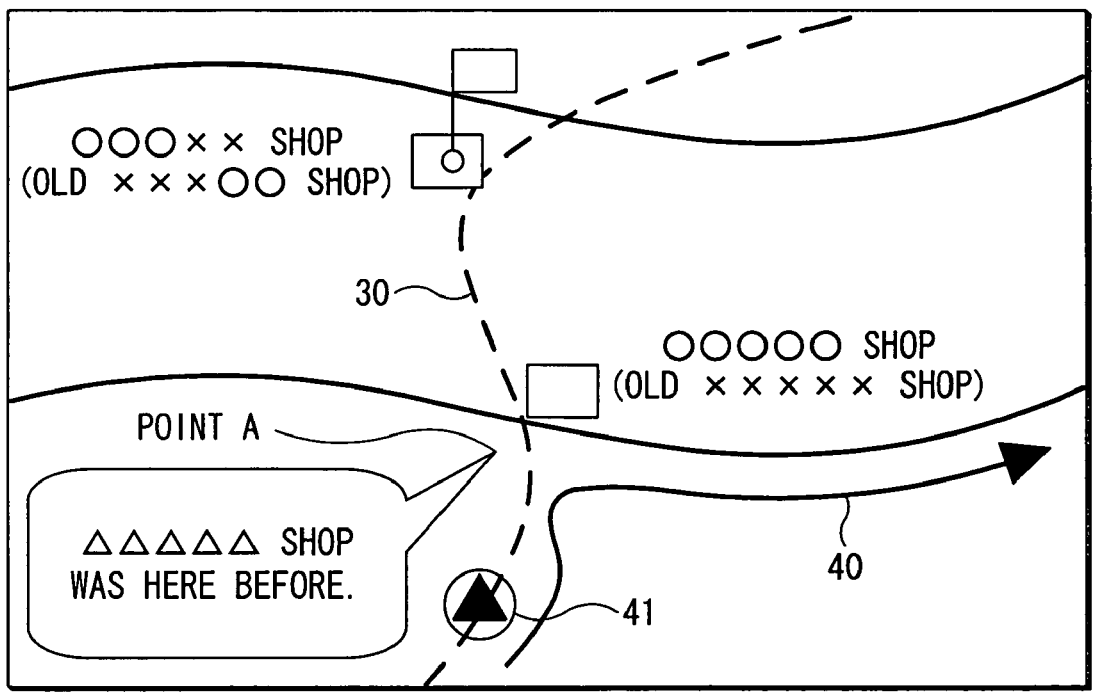
FIG. 6 is an example of a display screen for notifying the user of updated information while the user executes route guidance to a set destination.

FIG. 6 illustrates an example of a display screen for notifying the user of the updated information while the user executes route guidance to a set destination. Road 30 shown in FIG. 6 is a travel route that the user has traveled before. Along the travel route, the facility that was "xxxxx shop" has changed to "○○○○○ shop", and the facility that was "xxx○○ shop" has changed to "○○○xx shop". After the change, the user generates updated map data by the second map data where the changes are reflected as the latest information. Even in such a case, the vehicle navigation system 10 according to this embodiment can display the facility along the travel route by the updated information as "○○○○○ shop (old xxxxx shop)" and "○○○xx shop (old xxx○○ shop)" to notify the user of the changes. Consequently, even when the user remembers an intersection by using "xxxxx shop" as a landmark before and does not know that it has changed to "○○○○○ shop", the system can provide the information readily to the user.

A navigation route 40 shown in FIG. 6 is a searched route to a destination that the user has set. The user is traveling at a current position 41. In such a situation, the vehicle navigation system 10 according to this embodiment can generate voice guidance readily transmitted to the user from the speaker 9 by using the updated information that the updated information generation section 25*c* generates. More specifically, the system can generate voice guidance such as "Turn right at the intersection 300 m ahead. Use "○○○○○ shop" as a landmark. It was "xxxxx shop before"", for example. This makes it possible to provide the information as information readily transmitted to the user even if he/she does not know that "xxxxx shop" was changed to "○○○○○ shop" at the intersection where the user recognized that "xxxxx shop" was there before. Note that it is also possible to notify the user of the updated information by using both the updated information (display information) that the updated information generation section 25*a* or 25*b* generates and the updated information (voice guidance) that the updated information generation section 25*c* generates in combination.

Point A shown in FIG. 6 is a position where "△△△△△ shop" was before. In such a situation, the vehicle navigation system 10 according to this embodiment can display "△△△△△ shop was here before", for example, as shown in FIG. 6 by using the updated information that the updated information generation section 25*a* generated instead of an icon showing a facility. Subsequently, in the vehicle navigation system 10 according to this embodiment, it is possible to ask the user if a changed location of facility should be displayed by displaying updated information such as "Do you want to display the changed location of the facility?" that the updated information generation section 25*a* generates. At this point, when the user wants to know the changed location of the facility, he/she can also display a road map on which an icon showing the facility after the change is displayed by selecting a sub-menu item "Display the facility at the changed location", for example. As described, the vehicle navigation system 10 according to this embodiment can also notify the user of the position of the facility after the change. Meanwhile, in displaying the search result as described above, updated information can be effectively provided to the user by notifying him/her of the updated information while executing route guidance. However, the operation is not limited to this, but updated information can be provided to the user in displaying a road map showing the current position of a vehicle or in displaying a road map that the user selected by a predetermined operation other than the road map showing the current position, for example.

After the user knows of the change of facility by the above-described updated information, for example, there are cases where he/she determines that only the facility after the change should be displayed the next time. In such a case, the vehicle navigation system 10 according to this embodiment can update the first map data into the corresponding second map data when the user selects a sub-menu item "Update selected facility information", for example. With this, only the facility after the change will be displayed in the future. Further, this makes it possible to reduce the capacity of updated map data.

Furthermore, there are also cases where the capacity of data that the HDD stores increases by repeatedly updating updated map data. Moreover, since the HDD can store music data in addition to the map data, the capacity of the HDD could increase by storing such data. For such a case, the map data update section 17a can automatically update the first map data into the corresponding second map data, in the vehicle navigation system 10 according to this embodiment. This makes it possible to prevent data stored in a storage device from overflowing the capacity of the device. Note that a predetermined capacity may be assigned to the updated map data without setting a predetermined capacity to the capacity of data stored in the HDD. Still further, in automatically updating data, a notice such as "Storage device is running out of capacity. Do you want to update the map data?" is displayed, for example, and the user may be allowed to select updating the first map data that the updated map data has into the corresponding second map data to secure capacity, or to select withdrawing the saving of music data, for example.

Consequently, it is possible to realize a vehicle navigation system capable of searching predetermined information and navigating a user more effectively even in the case where the user only after the map data was updated knows information from before the update.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A vehicle navigation system comprising:
    a map data read section configured to read first map data from a map database;
    a history information management section configured to manage history information that identifies a search result, the search result obtained based on applying search conditions specified by a user on the first map data;
    a map data acquisition section configured to acquire second map data including updated information that identifies said search result, the updated information identifying the search result subsequent to the acquisition of said second map data;
    a map data update section configured to generate updated map data using said first map data and said second map data; and
    wherein said map data update section is configured to generate said updated map data and store said updated map data as new first map data so that subsequent search results are obtained on the basis of the stored new first map data.

2. The vehicle navigation system according to claim 1, wherein said map data update section determines whether or not said first map data and said corresponding second map data are identical or are different, and if different, the map data update section generates said updated map data by updating said first map data that is not associated with corresponding history information, into said corresponding second map data.

3. The vehicle navigation system according to claim 1, wherein
    said map database comprises a storage device storing said first map data, and
    said map data update section stores said updated map data as new first map data into said storage device instead of said first map data.

4. The vehicle navigation system according to claim 3, wherein
    when the data capacity of said storage device reaches a predetermined capacity, said map data update section stores said first map data into said corresponding second map data.

5. The vehicle navigation system according to claim 1, wherein
    for search conditions specified by the user, a control section searches map data having data contents that fall within said search conditions by referring to said first map data and said second map data.

6. The vehicle navigation system according to claim 5, further comprising:
    a first updated information generation section that generates updated information for displaying display information based on said first map data together with display information based on said corresponding second map data.

7. The vehicle navigation system according to claim 6, wherein
    said first updated information generation section, when the positional information of a facility based on said first map data and the positional information of the facility based on said second map data are different, generates an icon representative of said facility indicating that a position of the icon is where said facility existed prior to the acquisition of said second map data, as updated information.

8. The vehicle navigation system according to claim 7, wherein
    said first updated information generation section generates display information for asking the user if the position of the facility based on said second map data should be displayed as updated information.

9. The vehicle navigation system according to claim 5, further comprising:
a second map data update section configured to generate updated information for alternately displaying display information based on said first map data with display information based on said corresponding second map data.

10. The vehicle navigation system according to claim 9, wherein
said display information is a facility name.

11. The vehicle navigation system according to claim 5, further comprising:
a third map data update section configured to generate updated information to produce voice guidance based on said first map data together with voice guidance based on said corresponding second map data.

12. The vehicle navigation system according to claim 11, wherein
in the case where map data having data contents, which fall within search conditions specified by the user, is said first map data, said control section executes a command for providing said updated information in notifying the user of a search result.

13. The vehicle navigation system according to claim 5, wherein
when the user is in the process of executing route guidance to a specified destination, said control section executes a command for providing said updated information at a predetermined timing.

14. The vehicle navigation system according to claim 5, wherein
when a road map is being displayed, said control section executes a command for providing said updated information at a predetermined timing.

15. The vehicle navigation system according to claim 5, wherein
said map data update section updates said first map data into said corresponding second map data when the user performs a predetermined operation.

\* \* \* \* \*